(12) United States Patent
Archer

(10) Patent No.: US 8,516,367 B2
(45) Date of Patent: Aug. 20, 2013

(54) PROXIMITY WEIGHTED PREDICTIVE KEY ENTRY

(75) Inventor: Donald Gene Archer, Euless, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 696 days.

(21) Appl. No.: 12/569,041

(22) Filed: Sep. 29, 2009

(65) Prior Publication Data

US 2011/0078563 A1   Mar. 31, 2011

(51) Int. Cl.
*G06F 17/21*   (2006.01)
(52) U.S. Cl.
USPC .......................................................... 715/257
(58) Field of Classification Search
USPC .......................................................... 715/257
See application file for complete search history.

(56) References Cited

U.S. PATENT DOCUMENTS

| | | | |
|---|---|---|---|
| 5,748,512 A * | 5/1998 | Vargas ........................ | 708/142 |
| 6,286,064 B1 | 9/2001 | King et al. | |
| 6,801,190 B1 * | 10/2004 | Robinson et al. ............ | 345/173 |
| 8,051,374 B1 * | 11/2011 | Shazeer ....................... | 715/257 |
| 2004/0155869 A1 * | 8/2004 | Robinson et al. ............ | 345/168 |
| 2004/0183833 A1 * | 9/2004 | Chua ........................... | 345/773 |
| 2005/0114115 A1 * | 5/2005 | Karidis et al. ............... | 704/10 |
| 2005/0190973 A1 * | 9/2005 | Kristensson et al. ........ | 382/229 |
| 2006/0028450 A1 * | 2/2006 | Suraqui ....................... | 345/169 |
| 2006/0256088 A1 | 11/2006 | Kong | |
| 2006/0274051 A1 * | 12/2006 | Longe et al. ................. | 345/173 |
| 2008/0100579 A1 | 5/2008 | Robinson et al. | |
| 2008/0167858 A1 * | 7/2008 | Christie et al. .............. | 704/10 |
| 2008/0244386 A1 * | 10/2008 | Fux et al. ..................... | 715/257 |
| 2008/0244387 A1 * | 10/2008 | Fux et al. ..................... | 715/257 |
| 2008/0244388 A1 * | 10/2008 | Fux et al. ..................... | 715/257 |
| 2008/0244389 A1 * | 10/2008 | Fux et al. ..................... | 715/257 |
| 2008/0244390 A1 * | 10/2008 | Fux et al. ..................... | 715/257 |
| 2009/0174667 A1 * | 7/2009 | Kocienda et al. ............ | 345/169 |
| 2010/0149103 A1 * | 6/2010 | Betts-Lacroix .............. | 345/168 |
| 2010/0259561 A1 * | 10/2010 | Forutanpour et al. ........ | 345/660 |
| 2011/0035209 A1 * | 2/2011 | Macfarlane .................. | 704/9 |
| 2011/0060984 A1 * | 3/2011 | Lee .............................. | 715/261 |
| 2011/0063224 A1 * | 3/2011 | Vexo et al. ................... | 345/168 |
| 2011/0063231 A1 * | 3/2011 | Jakobs et al. ................ | 345/173 |

OTHER PUBLICATIONS

Van den Bosch et al., Efficient Context-Sensitive Word Completion for Mobile Devices, ACM, MobileHCI 2008, Sep. 2-5, 2008, p. 465-470.*

* cited by examiner

*Primary Examiner* — Frank D Mills

(57) ABSTRACT

A portable device may attempt to predict words input by a user. In one implementation, the portable device may generate candidate words that correspond to predictions of the word being entered by the user. The candidate words being generated based on the characters input by the user of the portable device, characters in proximity to a last entered one of the input characters, and distance factors calculated based on distances between a touch-point on the a virtual keyboard and characters in proximity to the touch-point.

19 Claims, 7 Drawing Sheets

PROXIMITY WEIGHTED PREDICTIVE KEY ENTRY

BACKGROUND

Many electronic devices provide an option for a user to enter information. For example, a portable communication/computing device (e.g., a cell phone, smart phone, or digital assistant) may use an input device, such as a keypad or a touch-screen, for receiving user input. A keypad may send a signal to the device when a user pushes a button on the keypad. A touch-screen device may send a signal to the device when a user touches a virtual object on the display with a finger or a pointing device, such as a stylus.

In order to maximize portability, manufacturers frequently design mobile devices to be as small as possible. One problem associated with small devices is that there may be limited space for the user interface. For example, the size of a display, such as the touch-screen display, may be relatively small. Similarly, for mobile devices that include a keyboard or keypad, the keys may be smaller or more tightly arranged than a "normal" one. The small screen size or key size may make it difficult for the user to easily interact with the mobile device.

DETAILED DESCRIPTION OF PREFERRED EMBODIMENTS

The following detailed description refers to the accompanying drawings. The same reference numbers in different drawings may identify the same or similar elements.

Systems and/or methods described herein relate to text input to a portable device. As the user inputs text to the portable device, the device may form predictions of the word or phrase being entered by the user. The predictions may be based on, in addition to the characters entered by the user, characters that are in proximity (i.e., physically near), on the input device, to the characters entered by the user. The predictions may be displayed to the user, allowing the user to select any of the predictions that match the word being entered by the user. By using characters in proximity to the entered characters, the portable device may be able to correctly predict the word intended by the user, even when the user mis-keys a letter in the word.

Figure 1:
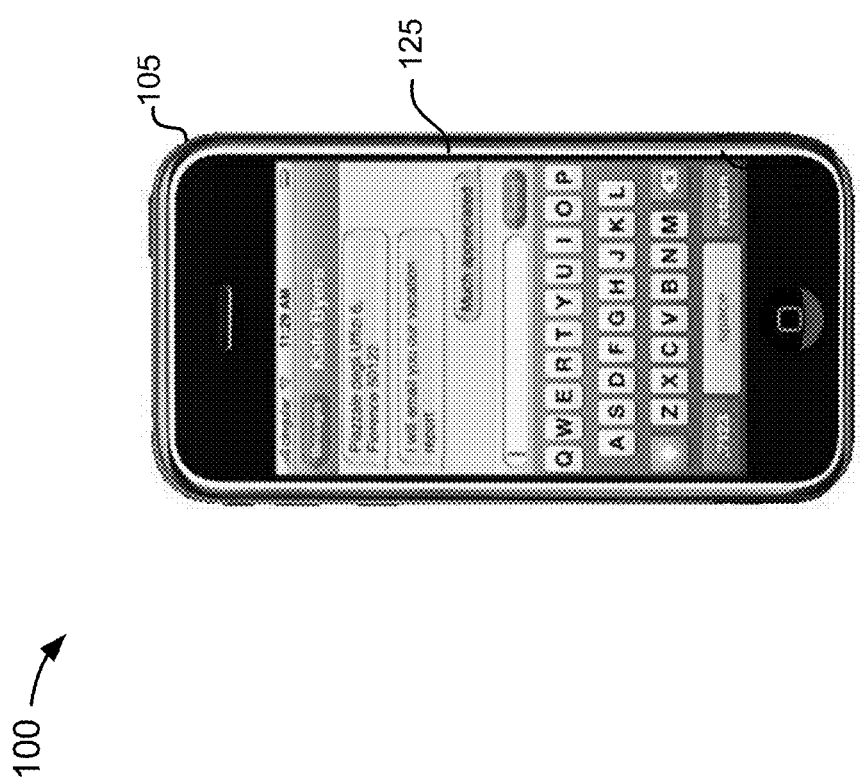
FIG. 1 is a diagram of an exemplary portable device in which the embodiments described herein may be implemented.

FIG. 1 is a diagram of an exemplary portable device 100 in which the embodiments described herein may be implemented. Portable device 100 is particularly illustrated as a mobile phone, such as a mobile smart phone. In other implementations, portable device 100 may be implemented as any portable device through which a user can enter textual input, such as a portable music device, gaming device, other type of mobile phone, or other computing device.

As illustrated in FIG. 1, portable device 100 may include a housing 105 and a touch-screen display 125. Additionally, other elements may be integrated within housing 105, such as a microphone, a speaker, and/or a camera. In other embodiments, portable device 110 may include fewer, additional, and/or different components, or a different arrangement of components than those illustrated in FIG. 1 and described herein.

Housing 105 may include a structure to contain components of mobile device 100. For example, housing 105 may be formed from plastic, metal, or some other material. Housing 105 may support touch-screen display 125.

A microphone may transduce a sound wave to a corresponding electrical signal. For example, a user may speak into microphone during a telephone call or to execute a voice command. A speaker may transduce an electrical signal to a corresponding sound wave. For example, a user may listen to music or listen to a calling party through the speaker.

Touch-screen display 125 may output visual content and may operate as an input component (e.g., a touch screen). For example, touch-screen display 125 may include a liquid crystal display (LCD), a plasma display panel (PDP), a field emission display (FED), a thin film transistor (TFT) display, or some other type of display technology. Touch-screen display 125 may display, for example, text, images, and/or video to a user.

In one implementation, touch-screen display 125 may include a touch sensing mechanism to implement touch-screen display 125. Touch-screen display 125 may correspond to a single-point input device (e.g., capable of sensing a single touch) or a multipoint input device (e.g., capable of sensing multiple touches that occur at the same time). Touch-screen display 125 may implement, for example, a variety of sensing technologies, including but not limited to, capacitive sensing, surface acoustic wave sensing, resistive sensing, optical sensing, pressure sensing, infrared sensing, gesture sensing, etc. Touch-screen display 125 may display a virtual "soft" keyboard through which a user may enter text. A soft keyboard, along with a messaging application area, is particularly shown as being displayed on the screen shown in FIG. 1.

Figure 2:
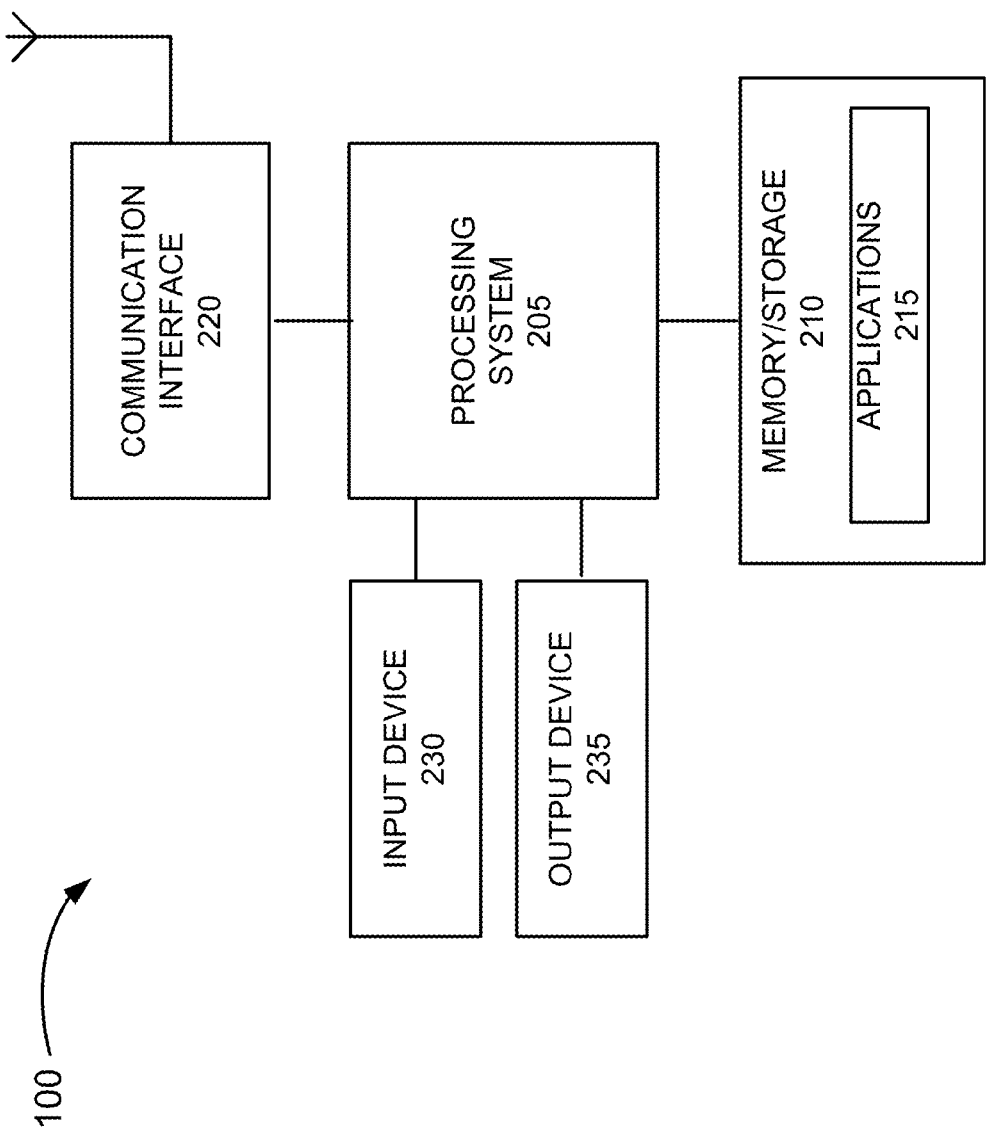
FIG. 2 is a diagram illustrating exemplary components of the portable device shown in FIG. 1.

FIG. 2 is a diagram illustrating exemplary components of portable device 100. As illustrated, portable device 100 may include a processing system 205, a memory/storage 210 (e.g., containing applications 215), a communication interface 220, an input device 230, and an output device 235. In other embodiments, portable device 100 may include fewer, additional, and/or different components, or a different arrangement of components than those illustrated in FIG. 2 and described herein.

Processing system 205 may include one or multiple processors, microprocessors, data processors, co-processors, network processors, application specific integrated circuits (ASICs), controllers, programmable logic devices, chipsets, field programmable gate arrays (FPGAs), and/or some other component that may interpret and/or execute instructions and/or data. Processing system 205 may control the overall operation (or a portion thereof) of portable device 100 based on an operating system and/or various applications.

Processing system 205 may access instructions from memory/storage 210, from other components of portable device 100, and/or from a source external to portable device 100 (e.g., a network or another device). Processing system

205 may provide for different operational modes associated with portable device 100. Additionally, processing system 205 may operate in multiple operational modes simultaneously. For example, processing system 205 may operate in a camera mode, a music playing mode, a radio mode (e.g., an amplitude modulation/frequency modulation (AM/FM) mode), and/or a telephone mode.

Memory/storage 210 may include memory and/or secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. The term "computer-readable medium," as used herein, is intended to be broadly interpreted to include a memory, a secondary storage, a compact disc (CD), a digital versatile disc (DVD), or the like. For example, a computer-readable medium may be defined as a physical or logical memory device. A logical memory device may include memory space within a single physical memory device or spread across multiple physical memory devices.

Memory/storage 210 may store data, application(s), and/or instructions related to the operation of portable device 100. For example, memory/storage 210 may include a variety of applications 215, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). At least some of the applications, such as the instant messaging application, may use text received from the user.

Communication interface 220 may permit portable device 100 to communicate with other devices, networks, and/or systems. For example, communication interface 220 may include an Ethernet interface, a radio interface, a microwave interface, or some other type of wireless and/or wired interface. Communication interface 220 may include a transmitter and/or a receiver.

Input device 230 may permit a user to input information to portable device 100. For example, input device 230 may include a microphone, keypad or keyboard, display or touch-screen display 125, a mouse, a button, a switch, an input port, voice recognition logic, and/or some other type of input component. As described herein, input device 230 may particularly include a soft keyboard that is designed to be used to enter textual information. Touch-screen display 125 may, at various times, be in an text input mode through which a user can touch characters to input text.

Output device 235 may permit portable device 100 to output information to a user and/or another device. For example, output device 235 may include a speaker, touch-screen display 125, one or more light emitting diodes (LEDs), an output port, a vibrator, and/or some other type of visual, auditory, tactile, etc., output component.

As previously mentioned, portable device 100 may attempt to predict words or phrases entered by the user. The prediction may be based, at least partially, on proximity of the keys to a key entered by a user on a soft keyboard presented on touch-screen display 125.

Figure 3:
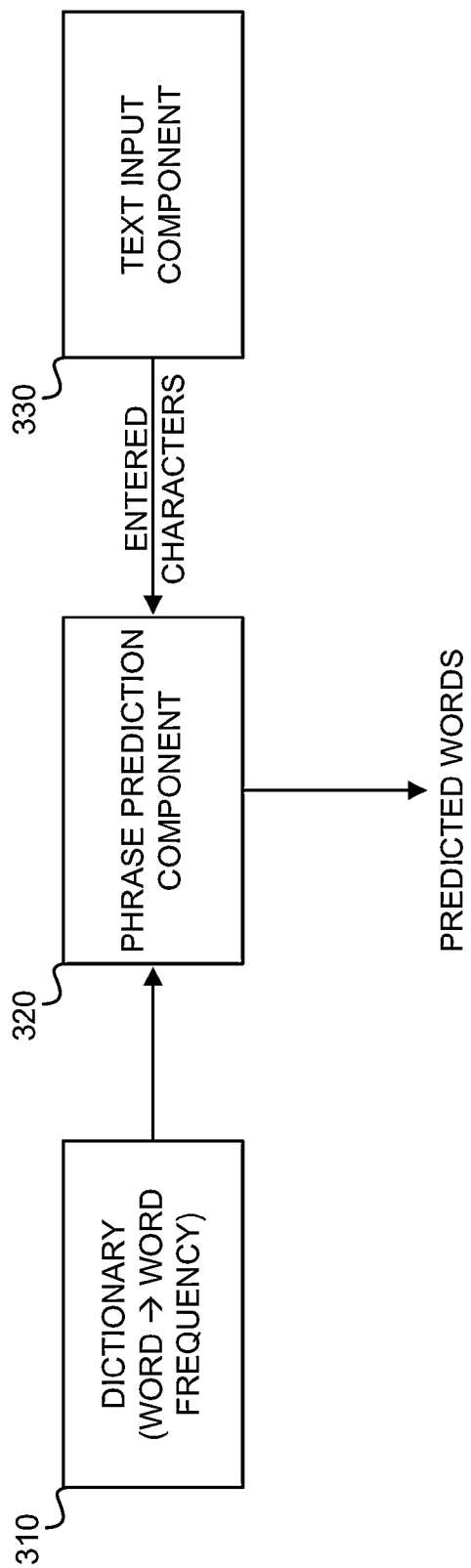
FIG. 3 is a diagram conceptually illustrating exemplary elements in a portable device for performing proximity based predictive text input.

FIG. 3 is a diagram conceptually illustrating exemplary elements in portable device 100 for performing proximity-based predictive text input. The components shown in FIG. 3 may be implemented, for example, by a combination of memory 210, processing system 205, and input device 230. As shown in FIG. 3, proximity based predictive text input may be implemented using a dictionary 310, phrase prediction component 320, and text input component 330.

Dictionary 310 may include a dictionary of words or phrases that are likely to be used by the user. As used herein, "words" and multi-word strings ("phrases") will be used synonymously with one another. In general, text prediction by portable device 100 may be performed to predict words, phrases, or both that are likely to be entered by the user. Dictionary 310 may include words in the language of the user, such as words in the English language. Dictionary 310 may additionally include custom words or proper names, such as words or names previously used by the user or words drawn from documents of the user, such as contact lists or other documents.

Dictionary 310 may also store, for each word in dictionary 310, a weight describing the likelihood of the word occurring or the relative frequency with which the word occurs. The weight describing the likelihood of the word occurring will be referred to herein as the "word frequency" or "word frequency value." In general, words that occur more frequently in the user's language may tend to have a higher word frequency value. For example, a common word such as "hello" may have a relatively high frequency value while a less common word such as "predictive" may have a relatively low frequency value. In one implementation, the word frequencies stored by dictionary 310 may be initially stored based on word frequency as the words occur in the user's language. For instance, a word that tends to occur ten times as often as another word may have a word frequency value that is ten times the less common word. In some implementations, the initial word frequency values may be updated based on user-specific documents or usage history to more accurately reflect the words most frequently used by the user of portable device 100. Dictionary 310 may provide its word/word frequency pairings to phase prediction component 320.

Text input component 330 may correspond to input device 230, and may include a keypad, keyboard, or touch-screen "soft" keypad or keyboard. Characters (i.e., letters, numbers, or symbols) input by the user through input component 230 may be received by phrase prediction component 320.

Phase prediction component 320 may generally operate to output words that are likely to match, based on the characters that have been entered by the user and based on dictionary 310, the complete word intended by the user. In this manner, instead of being required to enter the complete word, the user can select one of the predicted words to thus increase the ease with which the user enters text.

Figure 4:
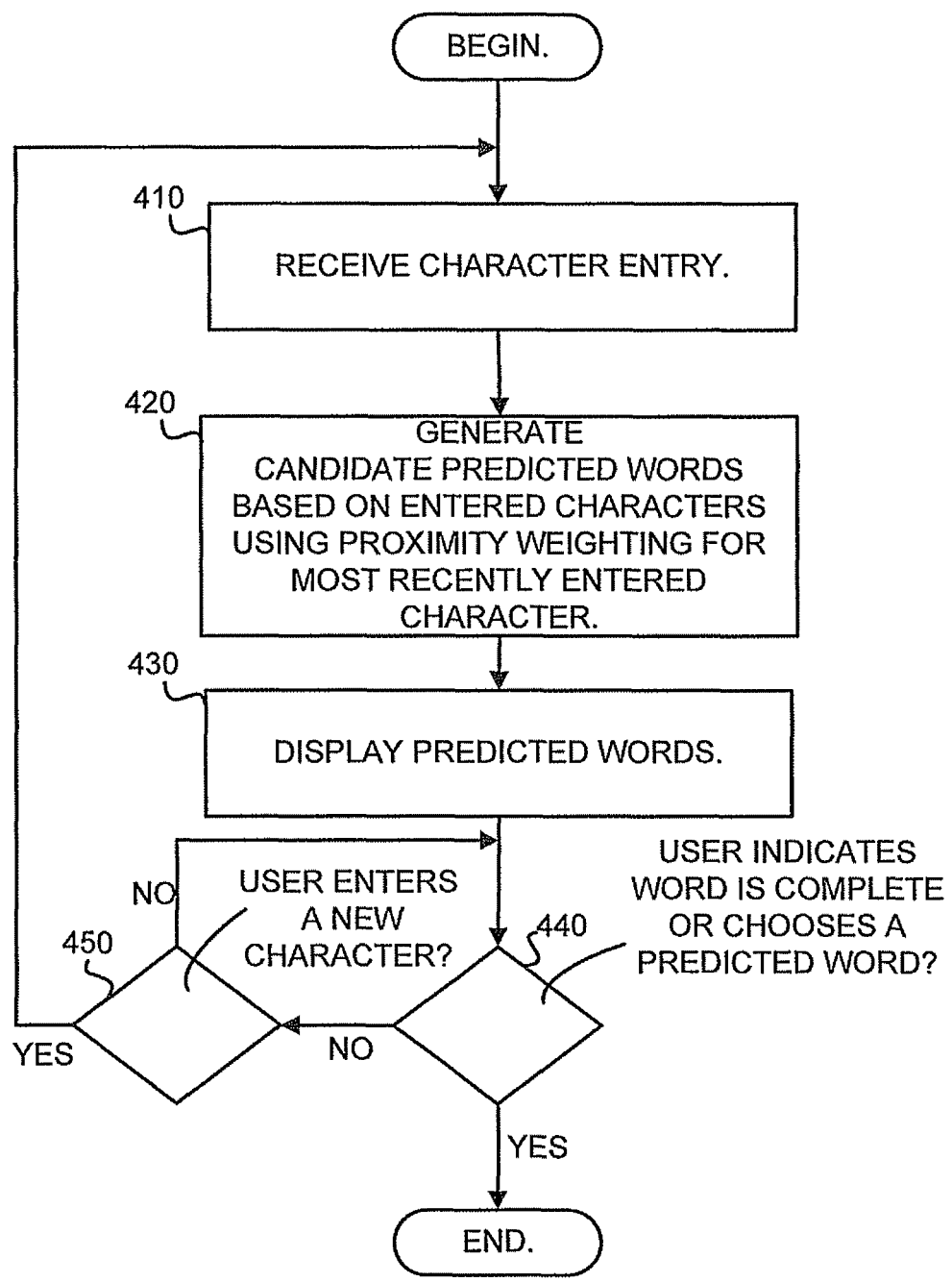
FIG. 4 is a flow chart illustrating exemplary operations that may be performed by the phrase prediction component shown in FIG. 3.

FIG. 4 is a flow chart illustrating exemplary operations that may be performed by phrase prediction component 320. The operations of FIG. 4 may be performed while a user is entering text into portable device 100.

Each character (e.g., letter or number) may be input through text input component 330 and received by phrase prediction component 320 (block 410). Phrase prediction component 320 may generate one or more candidate predicted words (block 420). The prediction may be based on a proximity weighting for the most recently entered character (block 420). The prediction of words by phrase prediction component 320 based on proximity weighting will now be described in more detail with reference to FIGS. 5 and 6.

Figure 5:
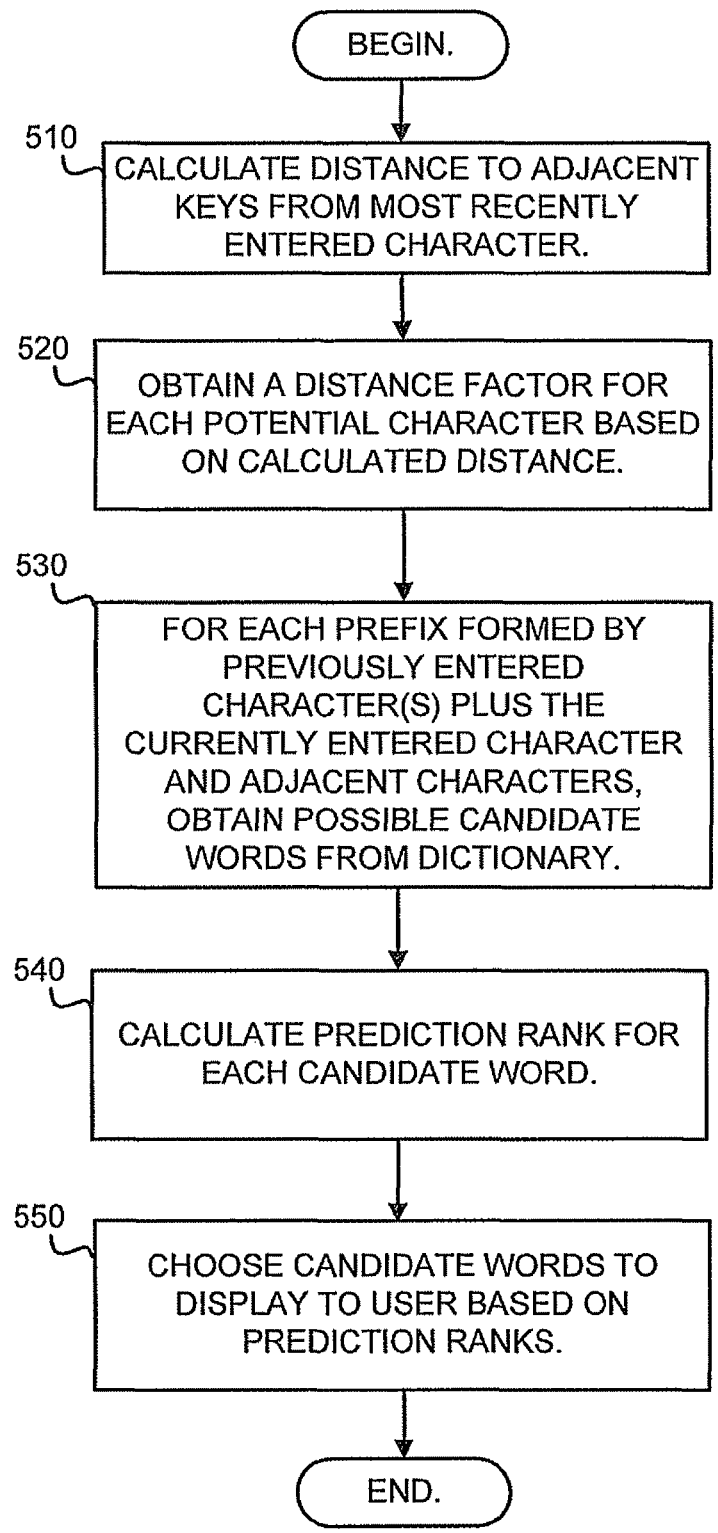
FIG. 5 is a flow chart illustrating exemplary operations for performing word prediction using proximity weighting.

FIG. 5 is a flow chart illustrating exemplary operations for performing word prediction using proximity weighting, as may be performed in block 420. For each of the keys surrounding a pressed key, phrase prediction component 320 may calculate the distance between the pressed location and the adjacent key (block 510). The distance may be calculated, in the case of a touch-screen display, as the distance between the touch point and the center of the adjacent key and may be based on the visual or pixel distance between the keys.

Figure 6:
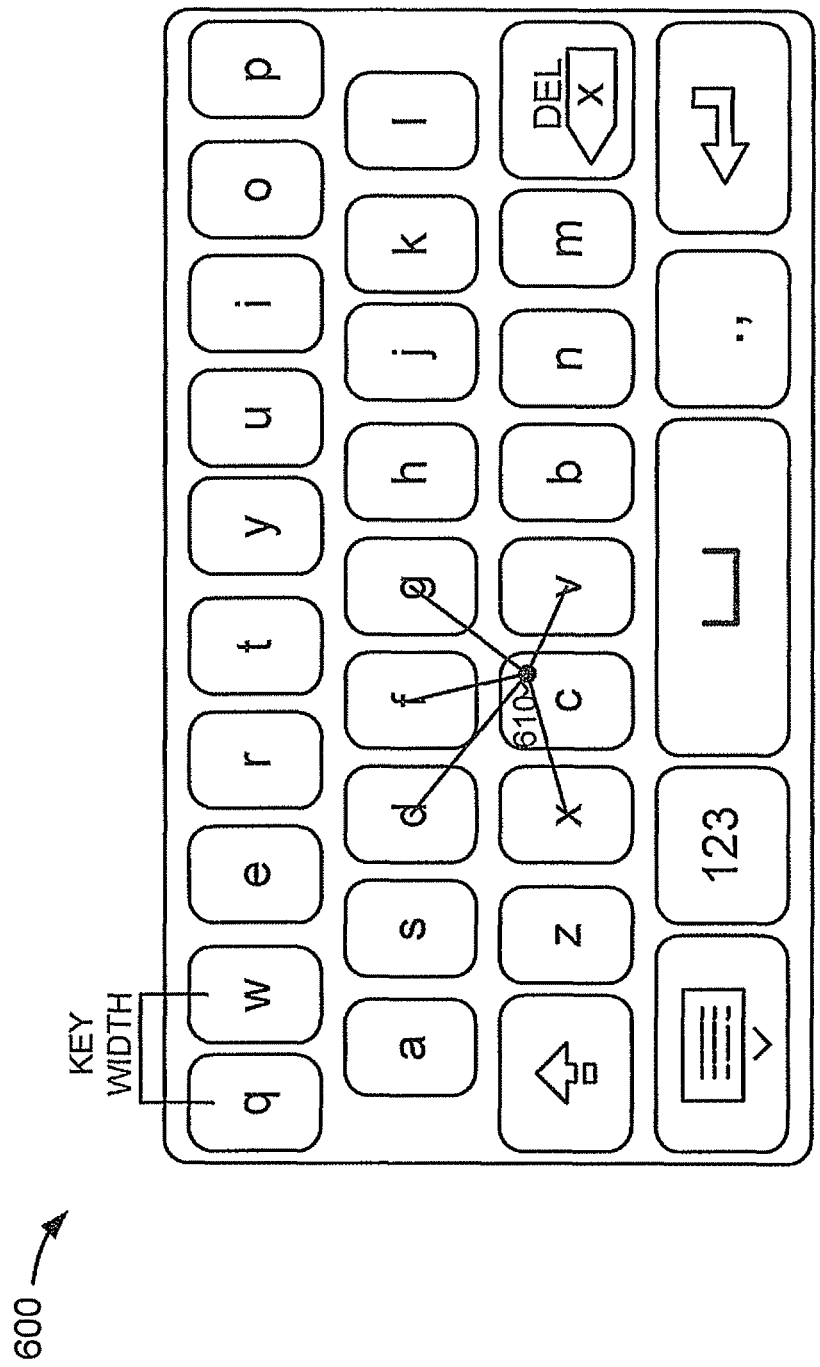
FIG. 6 is a diagram illustrating an exemplary soft keyboard.

FIG. 6 is a diagram illustrating an exemplary keyboard 600. Keyboard 600 may be a soft keyboard presented on touch-screen display 125, through which a user may touch the appropriate virtual keys to enter text. Assume that the user's touch point is point 610, corresponding to the letter C. The five adjacent character keys are keys X, D, F, G, and V. Five line segments, illustrating the five distances corresponding to the adjacent keys, are shown in FIG. 6 emanating from point 610.

Referring back to FIG. 5, prediction component 320 may next obtain a distance factor corresponding to each of the potential characters (i.e., each adjacent character key) (block 520). A distance factor may also be obtained for the touched key (e.g., C in FIG. 6). In general, the distance factor may be a value that represents how far "off" the user's key press action was to the potential characters associated with keys that are in the vicinity of the key press or touch. In one implementation, the distance factor may be a normalized version of the distance obtained by subtracting the key width from the calculated distances, where the key width is defined as the distance between two adjacent keys. A key width distance is shown in FIG. 6 as the distance between the Q and W keys. The distance factor could alternatively be calculated in other ways, such as by taking the inverse of the distance or simply by using the distance itself.

Phrase prediction component 320 may next obtain possible candidate words from dictionary 310. The possible candidate words may be obtained by matching each prefix formed by the previously entered characters and the currently entered character, as well as each prefix formed by the previously entered characters and the characters corresponding to the adjacent keys, to words in dictionary 310 to obtain the possible candidate words (block 530). For example, if the user has previously entered T, R, and A, and then presses point 610, the prefix TRAC may be matched to dictionary 310 to obtain words such as TRACE, TRACKER, and TRACT. Additionally, the prefixes TRAX, TRAD, TRAF, TRAG, and TRAV may also be matched to dictionary 310, to obtain possible candidate words such as TRAVEL, TRAVERSE, and TRAFFIC.

In some implementations, the matching performed in block 530 may, instead of including a matching of prefixes for the current word in dictionary 310, may also be based on other factors, such as previous words or phrases entered by the user.

A prediction rank may be calculated for each candidate word determined in block 530 (block 540). The prediction rank may correspond to a value calculated as an estimate of the likelihood that the candidate word is the intended word. The prediction rank may be based on the distance factor for the prefix. In one implementation, the prediction rank may also be based on the word frequency of the candidate word. For example, the prediction rank may be calculated as: wf*distance_factor, where wf is the word frequency.

As an example of the calculation of prediction ranks, consider the example of FIG. 6, in which the user has entered TRA and then enters C by touching point 610. In this example, assume that the word frequencies are stored in dictionary 310 in a normalized representation with a range of between zero (uncommon word) to one (common word). In this case, four exemplary candidate words are: TRACE (wf=0.1), TRACK (wf=0.5), TRAVEL (wf=0.9), and TRAVERSAL (wf=0.05). Further, assume that the distance factor is calculated as the difference between the key width and the calculated distance, and the key width is 40. In other words, the prediction rank is calculated as wf*(40−distance). For these words, the prediction ranks may be:

TRACE,0.1*(40−25)=1.5;

TRACK,0.5*(40−25)=10.5;

TRAVEL,0.9*(40−35)=4.5; and

TRAVERSAL,0.05*(40−35)=0.25.

As shown in this example, TRACK has the highest prediction rank. TRAVEL, even though its fourth letter is V and not C, has the next highest prediction rank.

The formula given in the previous paragraph to calculate the predication ranks is one exemplary way to calculate the prediction rank. Other techniques may be used to estimate the likelihood of a candidate word being the word which the user is currently typing, such as techniques that also take into account other words previously entered by the user. Consistent with aspects described herein, other techniques that incorporate the distance factor may alternatively be used.

Phrase prediction component 320 may determine which of the candidate words to present to the user (block 550). In one implementation, phrase prediction component 320 may choose a certain number (e.g., 2) of the highest ranking candidate words to present to the user. In the previous example, if the top two highest ranking candidate words are presented to the user, TRACK and TRAVEL may be chosen. Alternatively, phrase prediction component 320 may only display words that have at least a minimum rank value. For example, if phrase prediction component 320 only displayed words with a prediction rank higher than 1.0, in the previous example, TRAVERSAL may not be displayed to the user. In yet another alternative implementation, a combination of both a maximum number of candidates to display and a prediction rank threshold may be used to choose the candidate words.

Referring back to FIG. 4, portable device 100 may display the predicted words to the user (block 430). The predicted words may be displayed in a manner that makes it easy for the user to view the words and select one of the words. For example, for a soft keyboard design on touch-screen display 125, the predicted words may be displayed to overlap or be adjacent to the virtual keyboard and the user may select a displayed word by touching it.

At some point, the user may notice that the word being typed has been correctly predicted by portable device 100. The user may stop typing and select the predicted word (block 440, YES). Alternatively, the user may finish typing a word and may indicate the end of the word by, for example, typing a space character or return character (block 440, YES). Portable device 100 may use the selected word or completely entered word in whatever application with which the user is currently interacting. For example, if the user is entering text in an instant messaging application, portable device may insert the selected predicted word or the fully typed word as the next word in the message being typed by the user.

If the user enters another character (block 440, NO and block 450, YES), portable device 100 may re-perform the prediction operation (blocks 410, 420, and 430) based on the updated character string.

Figure 7:
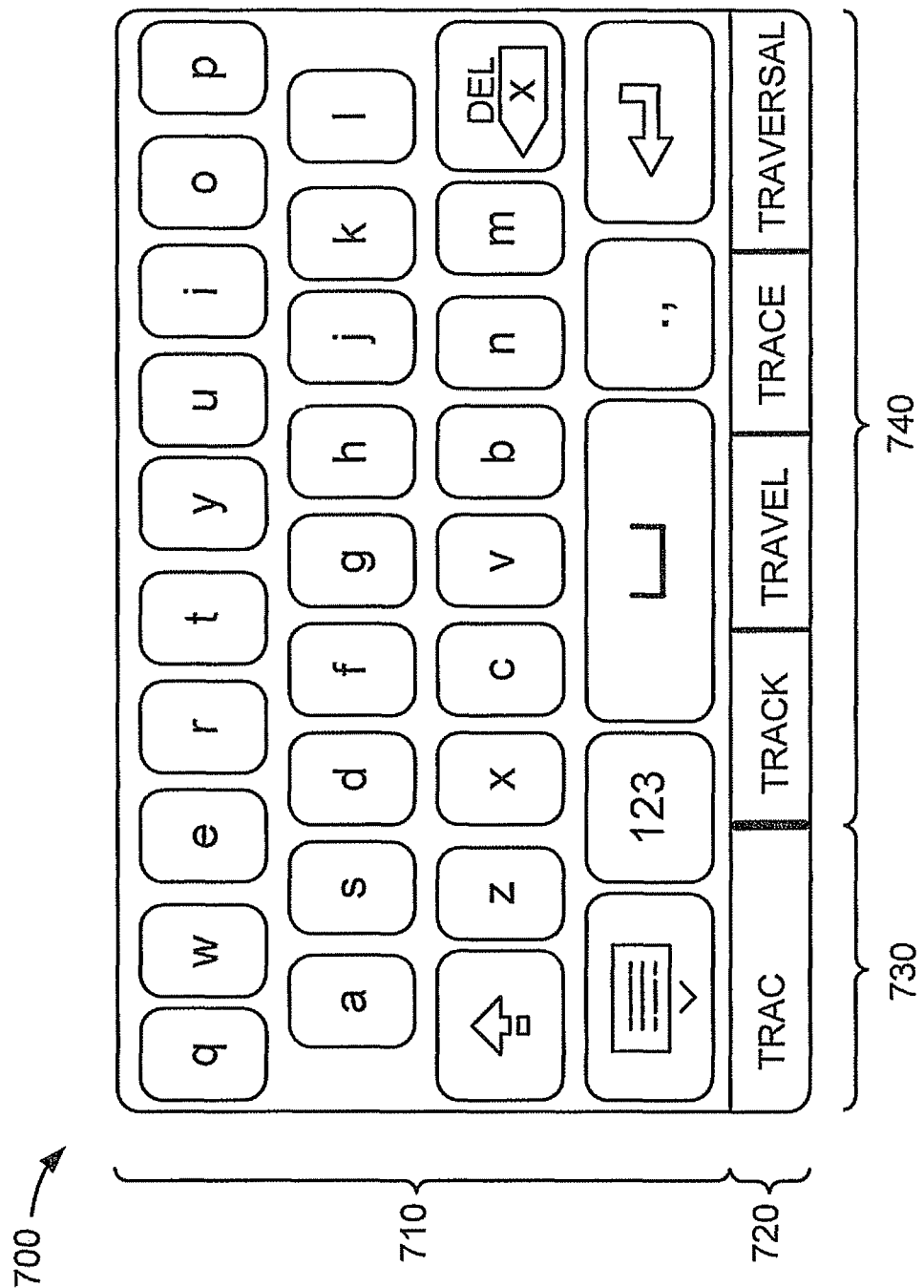
FIG. 7 is a diagram illustrating an exemplary user interface that displays words predicted by phrase prediction component.

FIG. 7 is a diagram illustrating an exemplary user interface 700 that displays words predicted by phrase prediction component 320. As shown, interface 700 includes a keyboard 710, such as the virtual touch-screen keyboard shown in FIG. 6. Interface 700 also includes a typing status section 720, which may include a typing section 730 and a predicted word section 740. Characters typed through keyboard 710 may be displayed in typing section 730. In predicted word section 740, portable device 200 may display candidate words to the user. The list of displayed candidate words may be updated after every keystroke. In this example, the user has typed TRAC, and the candidate words presented are: TRACK, TRAVEL, TRACE, and TRAVERSAL. If one of these four words is the words the user intends to type, the user may select the word by, for instance, touching the word. Advantageously, the user does not need to type the full word. Additionally, portable device 100 may be able to predict the correct word even when the user mistypes letters in the word.

The foregoing description of implementations provides illustration, but is not intended to be exhaustive or to limit the implementations to the precise form disclosed.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 4 and 5, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   receiving, from a portable device that displays a virtual keyboard, information identifying a location, on the virtual keyboard, selected by a user and an input character, on the virtual keyboard, corresponding to the location;
   forming, by the portable device, a plurality of prefixes including a prefix formed based on the input character and prefixes formed based on characters, on the virtual keyboard, in proximity to the input character;
   calculating, by the portable device, a distance factor for each of the plurality of prefixes,
      the distance factor for each of the plurality of prefixes being calculated as a difference between:
         a distance between the location and a center of a key, of the virtual keyboard, corresponding to a respective character of the characters, and
         a key width corresponding to a distance between a key, of the virtual keyboard, corresponding to the input character and the key, of the virtual keyboard, corresponding to the respective character;
   generating, by the portable device, candidate words from the plurality of prefixes;
   determining a rank value associated with each of the candidate words to obtain ranked values,
      the rank value associated with each of the candidate words being determined based on the distance factor determined for a respective prefix of the plurality of prefixes; and
   displaying, by the portable device and to the user of the portable device, a subset of the candidate words,
      the subset of the candidate words being determined based on the rank values associated with the candidate words.

2. The method of claim 1, further comprising:
   receiving a selection, from the user, of one of the generated candidate words; and
   using the selected one of the generated candidate words in an application run by the portable device.

3. The method of claim 1, where generating the candidate words includes:
   matching the plurality of prefixes to a dictionary to determine words that begin with one or more of the plurality of prefixes.

4. The method of claim 3, where determining the rank value associated with each of the candidate words includes:
   determining the rank value associated with the candidate word further based on:
      a value indicating a frequency of occurrence of the candidate word in documents of the user.

5. The method of claim 1, where forming the plurality of prefixes includes concatenating input characters, selected prior to the input character, with the input character and with the characters in proximity to the input character.

6. A portable device comprising:
   a processor to:
      display characters input by a user through interaction with a virtual keyboard presented on a touch-screen display of the portable device;
      generate, based on the characters input by the user, candidate words that correspond to a word being entered by the user through the interaction with the virtual keyboard,
         when generating the candidate words, the processor is to:
            form a plurality of prefixes including a prefix formed based on a particular character, of the characters, selected by the user on the virtual keyboard through the interaction, and prefixes formed based on one or more characters, on the virtual keyboard, in proximity to the particular character,
            calculate a distance factor for each of the plurality of prefixes,
               the distance factor for each of the plurality of prefixes being calculated as a difference between:
                  a distance between a location, on the virtual keyboard, corresponding to the particular character and a center of a key, of the virtual keyboard, corresponding to a respective character of the one or more characters, and a key width corresponding to a distance between a key, of the virtual keyboard, corresponding to the particular character and the key, of the virtual keyboard, corresponding to the respective character, and compare the plurality of prefixes to words in a dictionary to obtain the candidate words;

calculate a rank of each of the candidate words based on:

the distance factor determined for a respective prefix of the plurality of prefixes, and a frequency of occurrence of the candidate word in one or more documents of the user, and display the candidate words, on the touch-screen display, based on the rank of each of the candidate words.

7. The portable device of claim 6, where the dictionary additionally stores word frequency values, where each word frequency value, of the word frequency values, represents the frequency of occurrence of a respective candidate word, of the candidate words, in the one or more documents of the user.

8. The portable device of claim 6, where the processor is further to:

receive a selection, from the user, of one of the candidate words; and use the selected one of the candidate words in an application associated with the portable device.

9. The portable device of claim 6, where, when generating the candidate words, the processor is further to:

compare the plurality of prefixes to one or more words or one or more phrases, entered by the user prior to the characters, to obtain the candidate words.

10. A method comprising:

receiving, by a portable device, characters input by a user via a virtual keyboard of the portable device;

generating, by the portable device, candidate words that correspond to predictions of a word being entered by the user, each of the candidate words being associated with a different one of a particular character, of the characters input by the user, and one or more characters, on the virtual keyboard, in proximity to the particular character, each of the candidate words generated based on a distance factor calculated as a difference between:

a distance between a location, on the virtual keyboard, corresponding to the particular character selected by the user on the virtual keyboard and a key, of the virtual keyboard, corresponding to a respective character of the one or more characters, and a key width corresponding to a distance between a key, of the virtual keyboard, corresponding to the particular character and the key, of the virtual keyboard, corresponding to the respective character;

ranking, by the portable device, each of the one or more candidate words based on:

the distance factor associated with the candidate word, and a frequency of occurrence of the candidate word; and presenting, by the portable device, the ranked candidate words to the user of the portable device.

11. The method of claim 10, further comprising:

receiving a selection, from the user, of one of the presented candidate words; and using the selected one of the presented candidate words in an application run by the portable device.

12. The method of claim 10, where generating the candidate words includes:

generating prefixes based on the particular character and the one or more characters; and matching the prefixes to words, in a dictionary, to obtain the candidate words.

13. The method of claim 12, where calculating the distance factor, associated with each of the candidate words, includes:

determining the distance between the location and the key corresponding to a respective character of the one or more characters as a distance between the location and a center of the key corresponding to the respective character of the one or more characters.

14. A non-transitory computer-readable medium storing instructions, the instructions comprising:

a plurality of instructions which, when executed by a device, cause the device to:

receive information identifying a location, on a virtual keyboard of the device, selected by a user and a character, on the virtual keyboard of the device, corresponding to the location;

form a plurality of prefixes including a prefix formed based on the character and prefixes formed based on characters, on the virtual keyboard, in proximity to the character;

calculate a distance factor for each of the plurality of prefixes, the distance factor, for each of the plurality of prefixes, being calculated as a difference between:

a distance between the location and a key, of the virtual keyboard, corresponding to a respective character of the characters, and a key width corresponding to a distance between a key corresponding to the character and the key corresponding to the respective character;

generate candidate words from the plurality of prefixes;

calculate a rank of each of the candidate words, the rank of each of the candidate words being calculated based on:

the distance factor determined for a respective prefix of the plurality of prefixes, and a frequency of occurrence of the candidate word; and display one or more of the ranked candidate words, where the one or more of the candidate words being displayed based on the rank of each of the candidate words.

15. The non-transitory computer-readable medium of claim 14, the instructions further comprising:

one or more instructions to receive a selection, from the user, of a candidate word of the one or more of the ranked candidate words; and one or more instructions to use the selected candidate word in an application run by the portable device.

16. The non-transitory computer-readable medium of claim 14, where one or more instructions, of the plurality of instructions, to generate the candidate words include:

one or more instructions to match the plurality of prefixes to a dictionary of words to determine words that begin with the plurality of prefixes.

17. The non-transitory computer-readable medium of claim 14, where one or more instructions, of the plurality of instructions, to calculate the distance factor for each of the plurality of prefixes further include:

one or more instructions to determine the distance between the location and the key corresponding to a respective character of the characters as a distance between the location and a center of the key, of the virtual keyboard, corresponding to the respective character of the characters.

18. The non-transitory computer-readable medium of claim 17, where the frequency of occurrence of each of the candidate words includes a frequency of occurrence of the candidate word in documents of the user, and where the rank of each of the candidate words is calculated further based on the frequency of occurrence of the candidate word in the documents of the user.

19. The non-transitory computer-readable medium of claim 14, where one or more instructions, of the plurality of instructions, to form the plurality of prefixes include:

one or more instructions to concatenate one or more characters, selected prior to the character, with the character and with the characters in proximity to the character.

* * * * *